United States Patent
Kim et al.

(10) Patent No.: US 12,292,661 B2
(45) Date of Patent: May 6, 2025

(54) ELECTRONIC DEVICES INCLUDING TRANSFER LAYER, METHODS OF MANUFACTURING THE ELECTRONIC DEVICES, AND ELECTRONIC APPARATUSES INCLUDING THE ELECTRONIC DEVICES

(71) Applicant: SAMSUNG ELECTRONICS CO., LTD., Suwon-si (KR)

(72) Inventors: Hongsuk Kim, Seoul (KR); Young Kim, Yongin-si (KR); Hoon Song, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/892,752

(22) Filed: Aug. 22, 2022

(65) Prior Publication Data

US 2023/0266627 A1    Aug. 24, 2023

(30) Foreign Application Priority Data

Feb. 18, 2022   (KR) .................. 10-2022-0021734

(51) Int. Cl.
  *G02F 1/1347*   (2006.01)
  *G02F 1/1335*   (2006.01)
  *G02F 1/1368*   (2006.01)

(52) U.S. Cl.
  CPC ...... *G02F 1/1347* (2013.01); *G02F 1/133528* (2013.01); *G02F 1/1368* (2013.01)

(58) Field of Classification Search
  CPC .................................................... G02F 1/1347
  See application file for complete search history.

(56) References Cited

U.S. PATENT DOCUMENTS

| | | | |
|---|---|---|---|
| 6,878,607 B2 | 4/2005 | Inoue et al. | |
| 2008/0044671 A1 | 2/2008 | Lee et al. | |
| 2010/0200157 A1* | 8/2010 | Kimura | C08J 7/043 106/287.12 |
| 2018/0299726 A1* | 10/2018 | Oka | G02F 1/133528 |
| 2019/0025640 A1* | 1/2019 | Lee | G02F 1/1337 |
| 2020/0278772 A1* | 9/2020 | Toyooka | B32B 37/025 |
| 2021/0109272 A1 | 4/2021 | Kim et al. | |
| 2021/0405465 A1* | 12/2021 | Nakamura | G02F 1/133615 |
| 2022/0179513 A1* | 6/2022 | Kim | G06F 3/0446 |

FOREIGN PATENT DOCUMENTS

| | | |
|---|---|---|
| KR | 10-0803214 B1 | 2/2008 |
| KR | 10-2013-0138877 A | 12/2013 |
| KR | 10-1372286 B1 | 3/2014 |
| KR | 10-2019-0099726 A | 8/2019 |

\* cited by examiner

*Primary Examiner* — Edmond C Lau
(74) *Attorney, Agent, or Firm* — Sughrue Mion, PLLC (57) ABSTRACT

An electronic device including a transfer layer, a method of manufacturing the electronic device, and an electronic apparatus including the electronic device are provided. The electronic device includes a substrate having a thickness less than 0.7 mm; a first transfer layer provided on a first surface of the substrate, the first transfer layer including an organic material; and a first stack provided on the first transfer layer.

7 Claims, 9 Drawing Sheets

ELECTRONIC DEVICES INCLUDING TRANSFER LAYER, METHODS OF MANUFACTURING THE ELECTRONIC DEVICES, AND ELECTRONIC APPARATUSES INCLUDING THE ELECTRONIC DEVICES

CROSS-REFERENCE TO RELATED APPLICATION

This application is based on and claims priority under 35 U.S.C. § 119 to Korean Patent Application No. 10-2022-0021734, filed on Feb. 18, 2022, in the Korean Intellectual Property Office, the disclosure of which is incorporated by reference herein in its entirety.

BACKGROUND

1. Field

The present disclosure relates to electronic devices and methods of manufacturing the same, and more particularly, to electronic devices including a transfer layer, methods of manufacturing the electronic device, and electronic apparatuses including the electronic devices.

2. Description of the Related Art

Electronic devices, such as a semiconductor device or an optical device, may perform a variety of functions. The manufacture of such electronic devices may include processes such as a deposition process to create a material layer and a patterning process to sculpt the deposited material layer. In these processes, specialized manufacturing equipment specific to a corresponding process may be used.

Equipment used for manufacturing an electronic device may be affected by a thickness of a substrate on which the electronic device is formed. For example, in the case of a substrate that is particularly thin (i.e., having a thickness less than or equal to a predetermined thickness), a risk of cracking the substrate may increase during the manufacturing process, and thus, it may be difficult to stably use such manufacturing equipment. Accordingly, thinning or slimming of the electronic device may be limited.

SUMMARY

Example embodiments provide electronic devices having a small thickness less than that of electronic devices in the related art.

Example embodiments also provide methods of manufacturing electronic devices having a small thickness.

Example embodiments also provide methods of manufacturing electronic devices free from thickness limitations of a substrate associated with the traditional use of manufacturing equipment.

Example embodiments also provide electronic apparatuses including the electronic devices.

Additional aspects will be set forth in part in the description which follows and, in part, will be apparent from the description, or may be learned by practice of the presented embodiments of the disclosure.

According to an aspect of an example embodiment, an electronic device includes: a substrate having a thickness less than 0.7 mm; a first transfer layer provided on a first surface of the substrate, the first transfer layer including an organic material; and a first stack provided on the first transfer layer.

The electronic device may further include a second stack provided on the first stack.

The second stack may include an actively controlled liquid crystal layer.

The second stack may include a layer structure included in any one from among a beam deflector, a beam deflector lens, a sensor, a thin-film transistor (TFT), a micro light emitting diode (LED), an element used as a component of a touch screen panel, an element used as a component of a digital information display (DID), and an element used as a component of a display device.

The electronic device may further include another layer between the first stack and the second stack.

The other layer may include a polarization converter.

The first stack may include an actively controlled liquid crystal layer.

The first stack may include a layer structure included in any one of: a beam deflector, a beam deflector lens, a sensor, a thin-film transistor (TFT), a micro light emitting diode (LED), an element used as a component of a touch screen panel, an element used as a component of a digital information display (DID), and an element used as a component of a display device.

The electronic device may further include: a second transfer layer provided on a second surface of the substrate; and a second stack provided on the second transfer layer, wherein the second surface is located at a position different from a position of the first surface.

The second transfer layer may include an organic material.

The first stack may include a first electrode layer.

The second stack may include a second electrode layer.

The electronic device may further include: a first tracer and a second tracer that are provided on one side of the first stack; bonding regions provided at respective ends of the first tracer and the second tracer; and a transistor array provided between the first stack and the first and second tracers, wherein the transistor array may include a multiplexer thin film transistor (MUX TFT).

According to an aspect of an example embodiment, a method of manufacturing an electronic device, includes: forming a first transfer layer on a first substrate having a first thickness; forming a first stack on the first transfer layer; separating the first transfer layer on which the first stack is formed from the first substrate; and moving the first transfer layer separated from the first substrate on a first surface of a second substrate having a second thickness, wherein the second thickness is less than the first thickness.

The first transfer layer may include an organic material.

The method may further include, prior to the moving of the first transfer layer onto the first surface of the second substrate, coating at least one of the first surface of the second substrate and a surface of the first transfer layer corresponding to the first surface with an adhesive.

The method may further include transferring a second stack onto the first stack transferred onto the first surface of the second substrate, and another layer may be provided between the first stack and the second stack.

The transferring of the second stack may include: forming a second transfer layer on a third substrate having a third thickness greater than the second thickness; forming a portion of material layers included in the second stack on the second transfer layer; separating the second transfer layer on which a portion of the material layers included in the second stack is formed from the third substrate; moving the separated second transfer layer onto one surface of a fourth substrate having a fourth thickness; and moving the fourth substrate on which the separated second transfer layer is moved onto the other layer provided on the first stack, and the fourth thickness may be less than the first thickness and the third thickness.

Each of the first stack and the second stack may include an actively controlled liquid crystal layer, and the other layer may include a polarization converter configured to change a polarization.

The first stack may include a layer structure included in any one of a beam deflector, a beam deflector lens, a sensor, a TFT, a micro LED, an element used as a component of a touch screen panel, an element used as a component of a DID, and an element used as a component of a display device.

The second stack may include a layer structure included in any one from among a beam deflector, a beam deflector lens, a sensor, a thin-film transistor (TFT), a micro light emitting diode (LED), an element used as a component of a touch screen panel, an element used as a component of a digital image display (DID), and an element used as a component of a display device.

The method may further include: forming a second stack on the second transfer layer; and moving the second transfer layer on which the second stack is formed on a second surface of the second substrate, and the second surface may be located at a position different from a position of the first surface.

Each of the first stack and the second stack may include an electrode layer.

According to an aspect of an example embodiment, an electronic apparatus including at least a light source configured to generate light; and a beam deflector configured to deflect the light, wherein the beam deflector includes: a substrate having a thickness less than 0.7 mm; a first transfer layer provided on a first surface of the substrate, the first transfer layer including an organic material; and a first stack provided on the first transfer layer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, an electronic device including a transfer layer, a method of manufacturing the same, and an electronic apparatus including the electronic device according to various embodiments will be described in detail with reference to the accompanying drawings. The drawings are not to scale, and thicknesses of layers and regions may be exaggerated for clarification of the specification. In addition, the following embodiments described below are merely illustrative, and various modifications may be possible from the embodiments of the present disclosure. In a layer structure described below, when an element or layer is referred to as being "on" or "above" another element or layer, the element or layer may be directly on another element or layer or intervening elements or layers. In the following descriptions, like reference numerals refer to like element.

First, an electronic device including a transfer layer according to an embodiment will be described.

Figure 1:
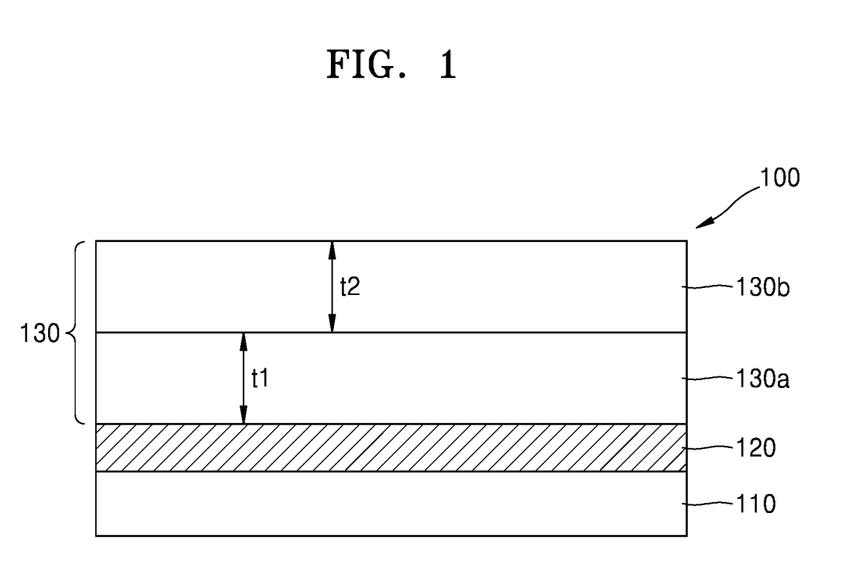
FIG. 1 is a cross-sectional view illustrating an electronic device including a transfer layer according to an embodiment.

FIG. 1 shows a first electronic device 100 including a transfer layer according to an embodiment.

Referring to FIG. 1, the first electronic device 100 includes a substrate 110, a transfer layer 120, and a first stack 130. The substrate 110, the transfer layer 120, and the first stack 130 are sequentially stacked in the order described, but the stacking is not limited thereto. In an example embodiment, the substrate 110 may include a semiconductor substrate or a glass substrate, but embodiments are not limited thereto. In an example embodiment, the semiconductor substrate may include a silicon substrate, but embodiments are not limited thereto. In an example embodiment, the substrate 110 may include an insulating substrate, or a substrate including an insulating layer that may be in contact with the transfer layer 120. In an example embodiment, the substrate 110 may have a thickness of about 0.7 mm or less, of about 0.5 mm or less, or in a range of about 0.1 mm to about 0.6 mm, or may be 0.7 mm or more, but embodiments are not limited thereto.

The transfer layer 120 may be a material layer used to transfer the first stack 130 onto the substrate 110. In an example embodiment, the transfer layer 120 may be an organic material layer or may include an organic material layer. In one example, the organic material may include a polymer. For example, the transfer layer 120 may be formed as a varnish-type or a film-type. In an example embodiment, the material of a transfer layer of the varnish-type or film-type may include any one of a polysilicon-based material, a polyimide-based material, and a polyurethane-based material. For example, the transfer layer 120 may include one or more materials including polyimide, polyvinyl alcohol, polyamic acid, polyamide, polyethylene, polystyrene, polynorbornene, phenylmaleimide copolymer, polyazobenzene, polyphenylenephthalamide, polyester, polymethyl methacrylate, polyarylate (polyarylate), a cinnamate-based polymer, a coumarin-based polymer, a phthalimidine-based polymer, a chalcone-based polymer, and an aromatic acetylene-based polymer. The transfer layer 120 may be provided on a surface of the substrate 110. The transfer layer 120 may be provided to cover an entirety of that surface of the substrate 110. In an example embodiment, the surface of the substrate 110 covered by the transfer layer 120 may be an overall flat plane. In an example embodiment, the surface of the substrate 110 covered by the transfer layer 120 may be an upper surface of the substrate 110, a bottom surface of the substrate 110 or a side surface of the substrate 110 depending on the viewpoint.

In an example embodiment, the transfer layer 120 may have a thickness in a range of about 1 µm to about 3 µm, but embodiments are not limited thereto.

The first stack 130 may include a layer structure including a plurality of layers. The plurality of layers of the first stack 130 may be sequentially stacked. In an example embodiment, the configuration, material, thickness, physical properties, planar shape, cross-sectional shape, and other properties of at least some layers of the plurality of layers may be the same as each other. In other embodiments, the configuration, material, thickness, physical properties, planar shape, cross-sectional shape, and other properties of each of the plurality of layers may be different from each other. For example, some of the plurality of layers may be single layers and the others may not be single layers. For example, some of the of the plurality of layers may include a single pattern in a single layer, and other layers may include a single layer but include a plurality of patterns separated from each other. In an example embodiment, the plurality of layers may include a plurality of single layers sequentially stacked with different physical properties (e.g., insulation, conductivity, material state). For example, some of the plurality of single layers may be solid material layers, and the remaining or other layers may be non-solid material layers. In an example embodiment, the non-solid material layer may include a liquid crystal layer. In an example embodiment, the first stack 130 may have a thickness greater than that of the transfer layer 120, and may be the same as or different from the thickness of the substrate 110. In an example embodiment, the first stack 130 may be a single stack, but may include a lower stack 130a and an upper stack 130b sequentially stacked. In an example embodiment, a layer structure and/or a layer configuration of the lower stack 130a and the upper stack 130b may be the same as or different from each other. In an example embodiment, another member (layer) may further be provided between the lower stack 130a and the upper stack 130b. In an example embodiment, the configuration of the lower stack 130a and the configuration of the upper stack 130b may be the same as or different from each other. In an example embodiment, the thickness t1 of the lower stack 130a and the thickness t2 of the upper stack 130b may be the same as or different from each other. In one example, the first electronic device 100 may be or include one of a beam deflector (BD), a beam deflector lens (BDL), one of sensors, a thin-film transistor (TFT), a micro light emitting diode (LED), an element used as a component of a touch screen panel, an element used as a component of a digital information display (DID), and an element used as a component of a display device (e.g., TV, LED display), but is not limited thereto. In an example embodiment, the lower stack 130a may be a BD or BDL or may include a part of a layer structure constituting the BD or BDL. In an example embodiment, the upper stack 130b may be a BD or BDL or may correspond to a part of a layer structure constituting the BD or BDL.

Next, a method of manufacturing an electronic device including a transfer layer according to an embodiment will be described with reference to FIGS. 2 to 8. In the following description, the same reference numbers as the aforementioned reference numbers indicate the same members, and a description thereof will be omitted.

Figure 2:
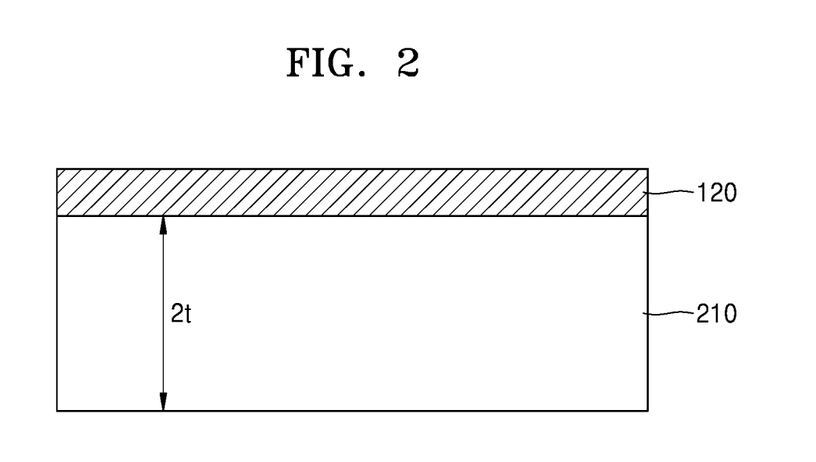
FIGS. 2 to 8 are cross-sectional views illustrating a method of manufacturing an electronic device including a transfer layer according to an embodiment.

Referring to FIG. 2, the transfer layer 120 is formed on the first substrate 210. In an example embodiment, the first substrate 210 may include a semiconductor substrate or a glass substrate. In an example embodiment, the semiconductor substrate may include a silicon substrate, but embodiments are not limited thereto. The first substrate 210 may have a thickness 2t greater than that of the substrate 110 of FIG. 1. In an example embodiment, the transfer layer 120 may be formed by using a spin coating method, a roll coating method, a dip coating method, a spray coating method, a screen coating method, or a slot die coating method.

Figure 3:
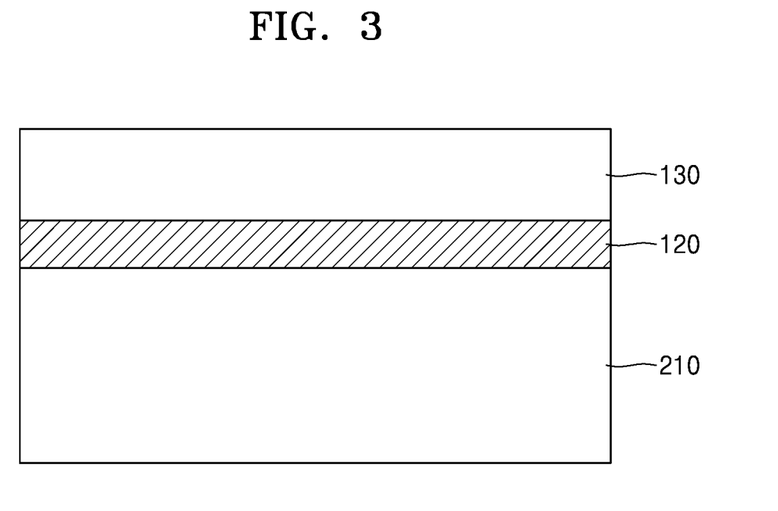

Next, as shown in FIG. 3, the first stack 130 is formed on the transfer layer 120. In forming the first stack 130, a deposition process, a photolithography process, a cleaning process, a drying process, and/or other fabrication techniques may be applied according to a layer configuration of the first stack 130. Because the first stack 130 is formed on the transfer layer 120, conditions for implementing processes included in the formation process of the first stack 130 may not lead to deterioration or damage of the transfer layer 120. The first stack 130 may be formed as a single layer stack, or may be formed by sequentially stacking the lower stack 130a and the upper stack 130b as shown in FIG. 1.

Figure 4:
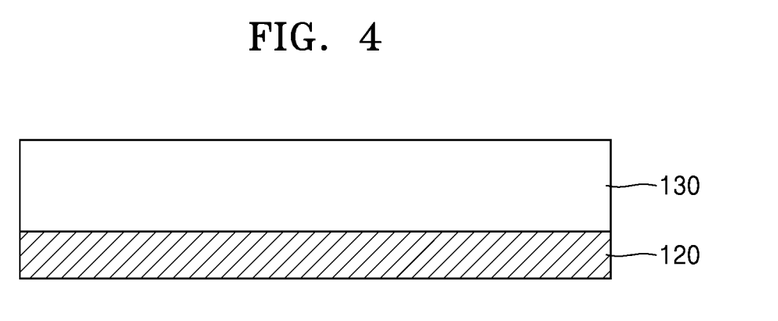

Next, as shown in FIG. 4, the transfer layer 120 is separated from the first substrate 210. In other words, the first substrate 210 is separated (removed) from a resultant product of FIG. 3. The separation of the first substrate 210 from the transfer layer 120 may be performed by irradiating light of a given wavelength between the first substrate 210 and the transfer layer 120 (for example, ultraviolet rays may be irradiated between the first substrate 210 and the transfer layer 120). For this separation, in operation of forming the transfer layer 120, a material that may be easily decomposed in response to a given wavelength may be coated between the first substrate 210 and the transfer layer 120. The easily decomposed material may be coated on a surface of the first substrate 210 on which the transfer layer 120 is formed, on a surface of the transfer layer 120 in contact with the first substrate 210, or on both surfaces.

Figure 5:
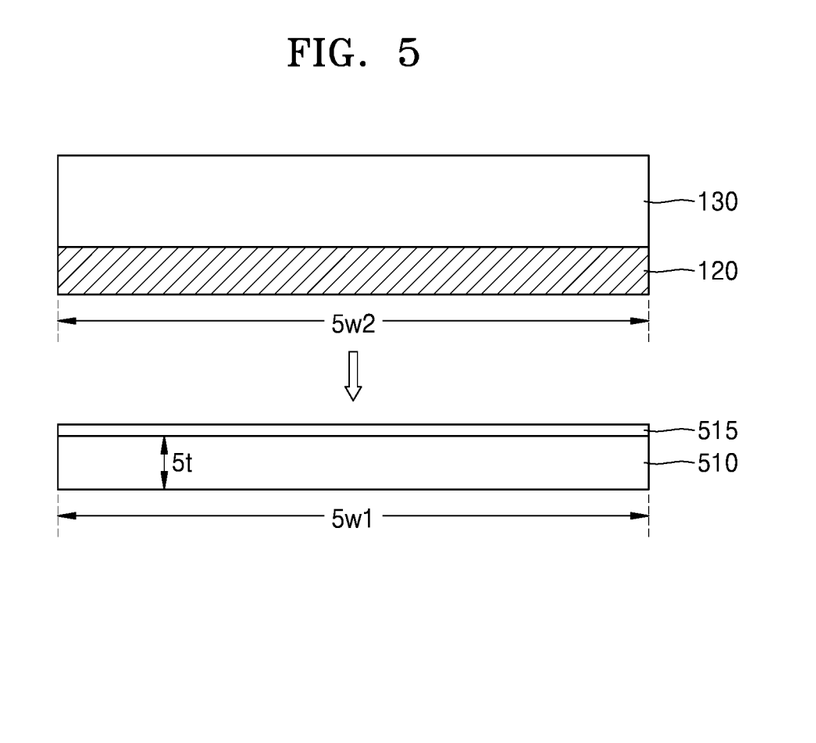

Next, a resultant product of FIG. 4, from which the first substrate 210 is removed (i.e., the sequentially stacked transfer layer 120 and the first stack 130) is aligned above a second substrate 510 as shown in FIG. 5, and in an alignment state, the transfer layer 120 and the first stack 130 are lowered on the second substrate 510 to attach the transfer layer 120 to the second substrate 510. In this way, the first stack 130 is transferred onto the second substrate 510. Accordingly, the transfer layer 120 may act as a material layer used to transfer the first stack 130 formed on the transfer layer 120 from the first substrate 110 to the second substrate 510. The transfer method using the transfer layer 120 may be applied not only to the transfer of BD or BDL, but also to the formation of various basic electronic devices, basic semiconductor devices, or various devices used as components in semiconductor devices or electronic apparatuses. A material of the second substrate 510 may be the same as that of the first substrate 210, but may be different from each other. The second substrate 510 is a transfer target substrate onto which a device or a layer structure already formed on the transfer layer 120 is simply transferred. Accordingly, the second substrate 510 may not undergo a process, such as deposition or patterning. Therefore, the second substrate 510 may have a thickness 5t less than the thickness 2t of the first substrate 210, and may be less than a limit thickness (e.g., 7 mm) of a substrate included in an electronic device of the related art. In one example, the second substrate 510 may have a thickness corresponding to the substrate 110 of FIG. 1.

As described above, the thickness 5t of the second substrate 510 may be formed to be less than the thickness of the thinnest substrates of electronic devices that are possible using related art methods and equipment of the related art, and thus, it is possible to obtain an overall thickness reduction of an electronic device (e.g., slim an electronic device), and furthermore, it may be helpful in slimming an electronic apparatus including the electronic device.

Before transferring the transfer layer 120 onto one surface (a transfer surface) of the second substrate 510, the corresponding surface of the second substrate 510 may be coated with a gluing agent 515 (e.g., an adhesive). The gluing agent 515 may be expressed as a gluing agent layer or an adhesive layer. Due to the gluing agent 515, the transfer layer 120 and the second substrate 510 may adhere to each other. In one example, the gluing agent 515 may be or include an optically clear adhesive (OCA) film or an optically clear resin (OCR), but is not limited thereto. For example, the gluing agent 515 may include any one of polyester, polyether, epoxy, silicone, and acrylic.

In an example embodiment, a width 5w1 of the second substrate 510 and a width 5w2 of the transfer layer 120 may be the same as or different from each other. For example, the width 5w1 of the second substrate 510 may be greater than the width 5w2 of the transfer layer 210.

Figure 6:
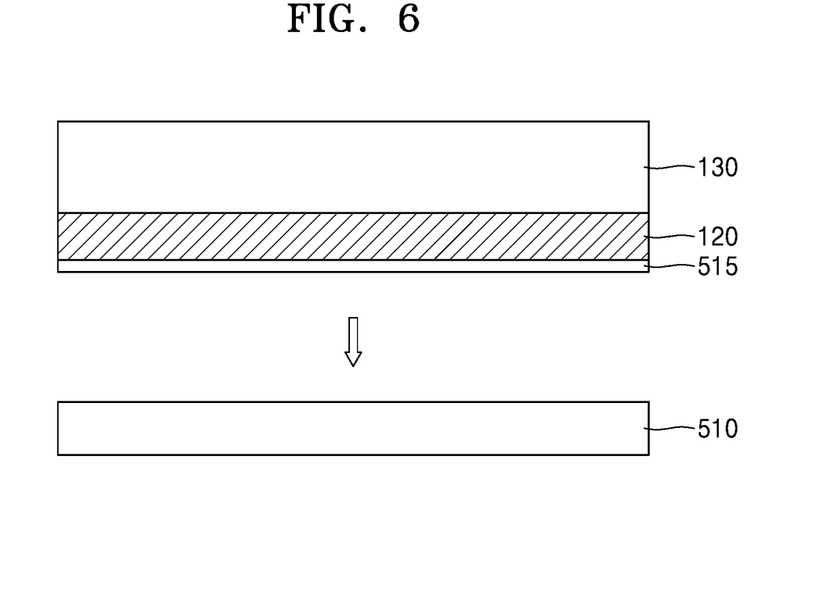

In an example embodiment, as shown in FIG. 6, the gluing agent 515 may be provided on a surface of the transfer layer 120 facing the second substrate 510 instead of being provided on the second substrate 510.

Figure 7:
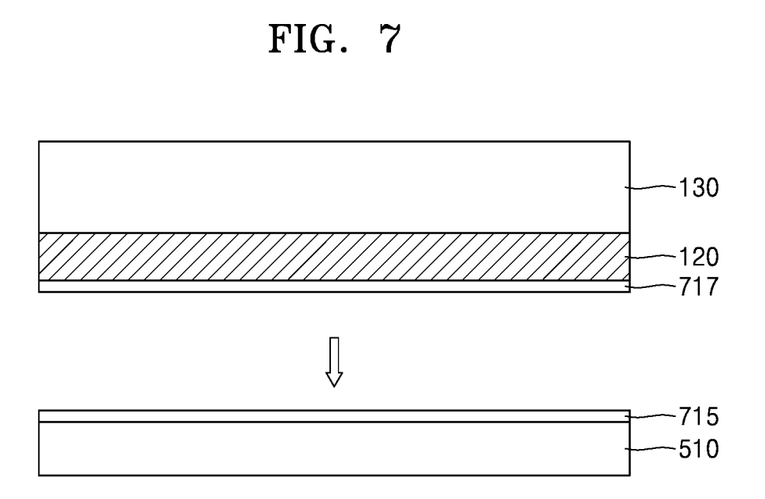

In an example embodiment, as shown in FIG. 7, a first gluing agent 715 may be provided on a surface of the second substrate 510, and a second gluing agent 717 may be provided on a surface of the transfer layer 120 facing the second substrate 510. FIG. 7 may be a result of combining resultant products of FIGS. 5 and 6.

Figure 8:
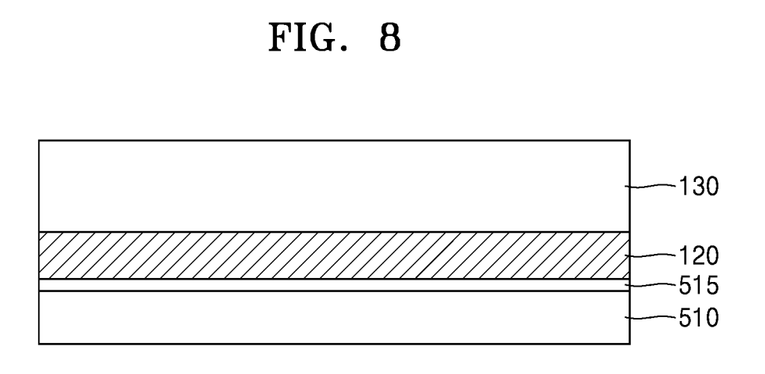

FIG. 8 shows a result of transferring the transfer layer 120 onto the second substrate 510.

Referring to FIG. 8, as the transfer layer 120 may be transferred onto the second substrate 510, the transfer layer 120 and the first stack 130 are sequentially stacked on the second substrate 510. In this way, an electronic device including a transfer layer may be formed. According to the layer configuration of the first stack 130, the electronic device of FIG. 8 may be various electronic devices. For example, when the layer configuration of the first stack 130 includes the layer configuration of BD, the electronic device of FIG. 8 may be a BD, and when the layer configuration of the first stack 130 includes a TFT, an LED, or an optical device (e.g., photodiode), the electronic device of FIG. 8 may be a TFT, an LED, or an optical device.

Figure 9:
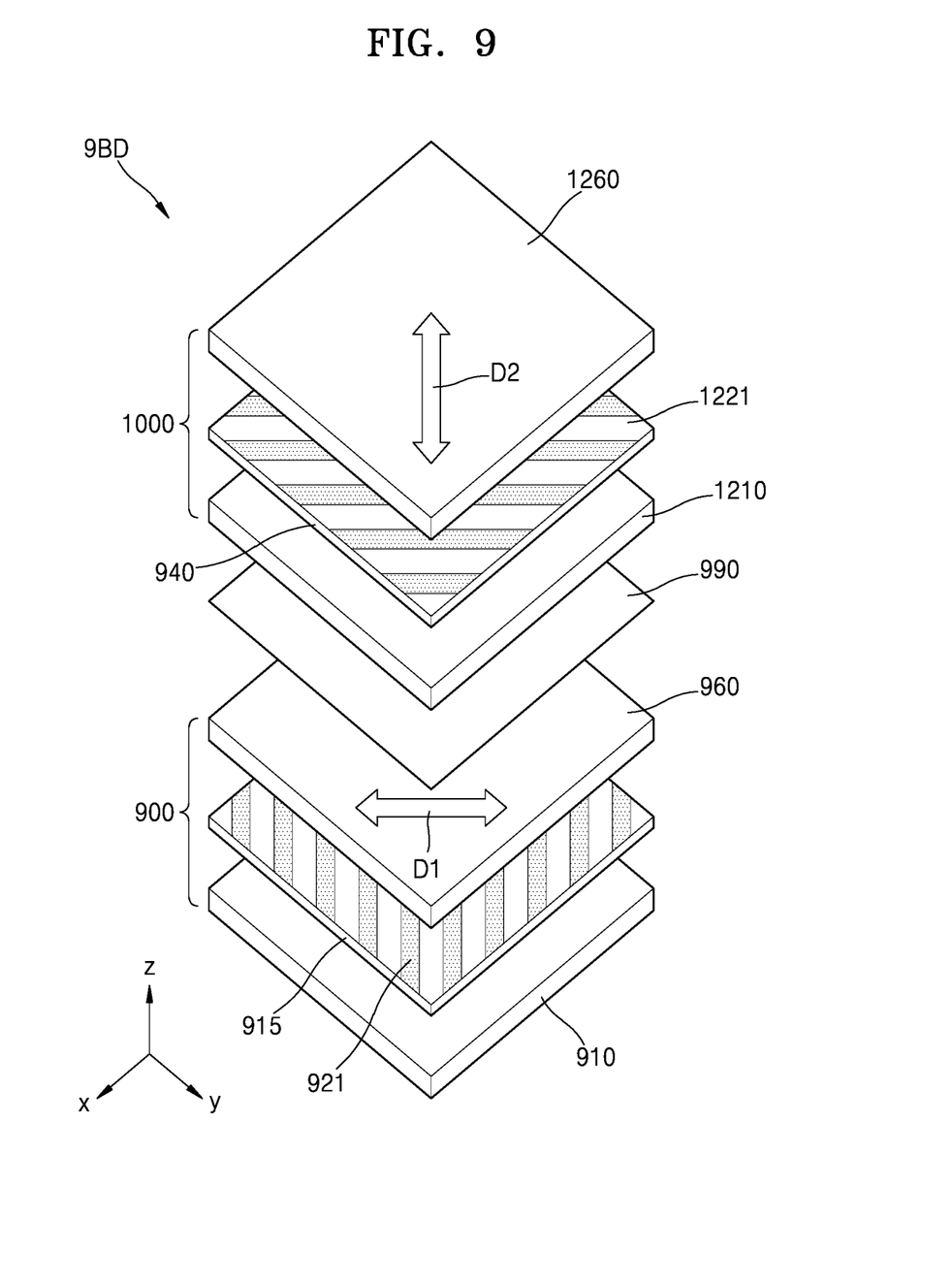
FIG. 9 is a perspective view schematically illustrating an example of the electronic device of FIG. 1 as a beam deflector.

FIG. 9 schematically shows an example case when the first electronic device 100 of FIG. 1 is a beam deflector.

Figure 10:
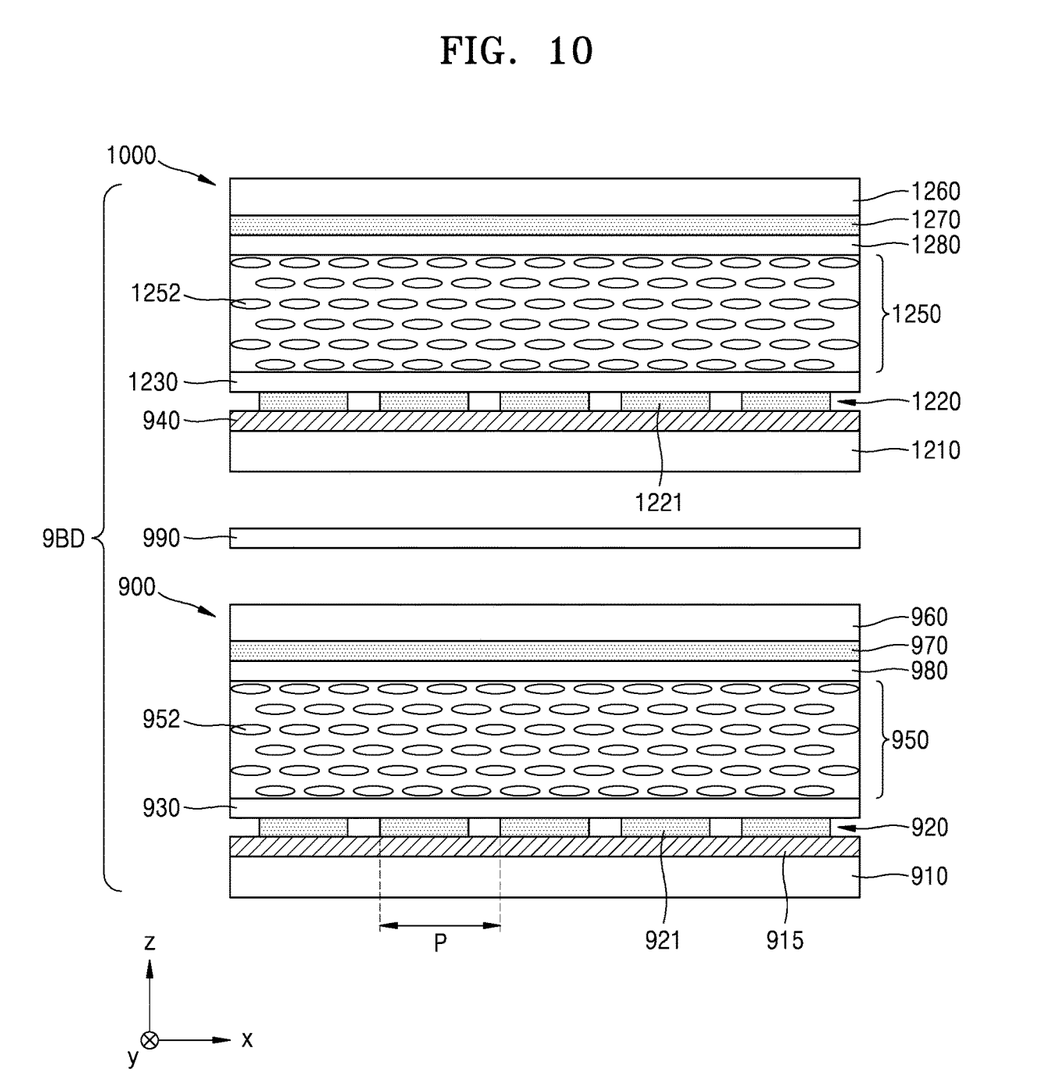
FIG. 10 is a cross-sectional view showing the beam deflector of FIG. 9 specifically.

FIG. 10 shows a specific structure of the beam deflector schematically shown in FIG. 9.

Referring to FIGS. 9 and 10, a beam deflector 9BD includes a first beam deflector 900, a polarization converter 990, and a second beam deflector 1000, which are sequentially stacked.

The polarization converter 990 is configured to convert polarization of light incident to the beam deflector 1000 so that light deflected in a first movement direction D1 by the first beam deflector 900 is deflected in a second movement direction D2 by the second beam deflector 1000.

In the first beam deflector 900, a transfer layer 915 is provided on one surface of the first substrate 910. The one surface of the first substrate 910 may be an upper surface thereof, but may be expressed as another surface depending on the viewpoint. The first substrate 910 may be a transfer target substrate onto which the transfer layer 915 and a layer structure (configuration) provided on the transfer layer 915 are transferred on the one surface of the first substrate 910. The transfer layer 915 may be in direct contact with the one surface of the first substrate 910 and may cover the whole of the one surface of the first substrate 910. In an example embodiment, a material of the first substrate 910 may be the same as that of the substrate 110 of FIG. 1, but may be different from each other. The first substrate 910 may have the same thickness as that of the substrate 110 of FIG. 1.

In the first beam deflector 900, a first electrode layer 920 including a plurality of first pattern electrodes 921 may be disposed on the transfer layer 915. The plurality of first pattern electrodes 921 may be separated from each other. The plurality of first pattern electrodes 921 may be arranged in a given shape. The first beam deflector 900 includes the first substrate 910 and a second substrate 960 disposed at a position facing the transfer layer 915. A second electrode layer 970 used as a common electrode is provided on one surface of the second substrate 960 facing the first substrate 910. The one surface of the second substrate 960 may be a bottom surface of the second substrate 960, but may be expressed differently depending on the viewpoint. The first substrate 910 and the second substrate 960 may include the same material or different materials from each other.

The first beam deflector 900 includes a liquid crystal layer 950 between the first substrate 910 and the second substrate 960. The liquid crystal layer 950 includes liquid crystals 952. When no electric field is applied, long axes of the liquid crystals 952 may be oriented to be parallel to the first movement direction D1.

In an example embodiment, the first substrate 910 and the second substrate 960 may include an insulating substrate, and may include a glass substrate or a transparent plastic substrate.

In an example embodiment, the first pattern electrodes 921 may be arranged in the first movement direction D1 with an angle of, for example, 45° or less with respect to a horizontal direction (x-axis direction). The first pattern electrode 921 may have a stripe shape extending in a direction crossing the first movement direction D1. The first pattern electrodes 921 may include a transparent conductive material. For example, the first pattern electrodes 921 may include indium-tin-oxide (ITO), indium-zinc-oxide (IZO), indium-tin-zinc-oxide (ITZO), silver nano wire (AgNW), polypyrrole, polyaniline, and poly(3,4-ethylene dioxythiophene) (PEDOT).

In an example embodiment, the second electrode layer 970 may be a flat-type common electrode. In one example, the second electrode layer 970 may include a plurality of patterned electrodes like the first electrode layer 920. In this case, the same voltage may be applied to the pattern electrodes of the second electrode layer 970. The second electrode layer 970 may include the same transparent conductive material as the first electrode layer 920.

In the first beam deflector 900, a first orientation layer 930 covering the first electrode layer 920 may be provided on the first substrate 910. The first orientation layer 930 may be provided between the first electrode layer 920 and the liquid crystal layer 950. A second orientation layer 980 may be provided between the second electrode layer 970 and the liquid crystal layer 950. A surface of the second electrode layer 970 facing the second orientation layer 980 may be covered with the second orientation layer 980. The second orientation layer 980 and the second electrode layer 970 may contact each other. The first and second orientation layers 930 and 980 may be provided so that the liquid crystals 952 are oriented in a given direction when no electric field is applied. That is, when no electric field is applied, the liquid crystals 952 are aligned in the given direction by the first and second orientation layers 930 and 980. In an example embodiment, the given direction may be a direction in which the long axes of the liquid crystals 952 is parallel to the first moving direction D1. In an example embodiment, the first and second orientation layers 930 and 980 may be polyimide layers or include polyimide.

In an example embodiment, a plurality of spacers including a polymer material may further be provided between the first substrate 910 and the second substrate 960. The spacer may have a diameter, for example, in a range of about 2.5 μm to about 3 μm. A gap between the first and second substrates 910 and 960 may be maintained by the spacer.

The liquid crystal layer 950 may be formed by injecting the liquid crystals 952 into a space between the first and second substrates 910 and 960. In this case, the liquid crystals 952 may be arranged so that long axes thereof are parallel to an orientation direction of the plurality of first pattern electrodes 921 in a state in which no electric field is applied. In this way, as the liquid crystals 952 are oriented, when a voltage is applied between the first pattern electrode 921 and the second electrode layer 970 of the first electrode layer 920, the orientation of the liquid crystals 952 is changed, and accordingly, incident light may be deflected by being phase-modulated.

In the first beam deflector 900, an entire stack 921+930+950+980+970+960 formed on the transfer layer 915 may have a layer structure (configuration). This layer structure may be expressed as one stack formed on the transfer layer 915.

The second beam deflector 1000 includes a transfer layer 940 on one surface of the first substrate 1210. The one surface of the first substrate 1210 may be an upper surface thereof, but may be expressed differently depending on the viewpoint. A material of the first substrate 1210 may be the same as or different from the material of the first substrate 910 of the first beam deflector 900. A thickness of the first substrate 1210 may be the same as or different from the thickness of the first substrate 910 of the first beam deflector 900. The first substrate 1210 may be a transfer target substrate to which the transfer layer 940 and a layer structure (configuration) provided on the transfer layer 940 are transferred on the one surface of the first substrate 1210. The transfer layer 940 and the layer structure 1220+1230+1250+1280+1270+1260 formed thereon may be transferred onto the first substrate 1210 according to the transfer method described with reference to FIGS. 2 to 8.

In the second beam deflector 1000, a first electrode layer 1220 including a plurality of second pattern electrodes 1221 may be provided on the first substrate 1210. The plurality of second pattern electrodes 1221 may be disposed to be separated from each other, and may have a shape aligned in a given direction. In the second beam deflector 1000, a second substrate 1260 is disposed at a position facing the first substrate 1210 and the transfer layer 940. The second substrate 1260 is disposed to face the first substrate 1210 with the transfer layer 940 therebetween. The second substrate 1260 may be the same as or different from the first substrate 1210 in material.

The second beam deflector 1000 includes a second electrode layer 1270 used as a common electrode on one surface of the second substrate 1260. The one surface of the second substrate 1260 may be a surface facing the first substrate 1210 or a bottom surface of the second substrate 1260, but may be expressed differently depending on the viewpoint. In addition, the second beam deflector 1000 includes a liquid crystal layer 1250 between the first substrate 1210 and the second substrate 1260. The liquid crystal layer 1250 includes liquid crystals 1252 that are oriented in a given direction when no electric field is applied. In an example embodiment, when no electric field is applied, long axes the liquid crystals 1252 may be oriented to be parallel to the second movement direction D2.

In the second beam deflector 1000, the first substrate 1210 and the second substrate 1260 may include an insulating substrate, and may include a glass substrate or a transparent plastic substrate.

The second pattern electrodes 1221 may be arranged, for example, in the second movement direction D2 with an angle of, for example, 45° or less with respect to the vertical direction (y-axis direction). The second pattern electrode 1221 may have a stripe shape extending in a direction crossing the second movement direction D2.

The second pattern electrodes 1221 may include a transparent conductive material. For example, the second pattern electrodes 1221 may include ITO, IZO, and ITZO.

In one example, the second electrode layer 1270 may be a flat plate type common electrode. In one example, the second electrode layer 1270 may include a plurality of patterned electrodes like the first electrode layer 1220. In this case, the same voltage may be applied to the pattern electrodes of the second electrode layer 1270. The second electrode layer 1270 may include the same transparent conductive material as the first electrode layer 1220.

The second beam deflector 1000 may include a first orientation layer 1230 that is provided on the first substrate 1210 and covers the first electrode layer 1220. The first orientation layer 1230 may be provided between the first electrode layer 1220 and the liquid crystal layer 1250. The first orientation layer 1230 may be in contact with the liquid crystal layer 1250.

In the second beam deflector 1000, a second orientation layer 1280 is provided between the second electrode layer 1270 and the liquid crystal layer 1250. The second orientation layer 1280 may be in contact with the liquid crystal layer 1250. The second electrode layer 1270 may be covered with the second orientation layer 1280.

Due to the first and second orientation layers 1230 and 1280, the liquid crystals 1252 may be oriented in a given direction when no electric field is applied. In one example, when no electric field is applied, the long axes of the liquid crystals 1252 may be oriented in a direction parallel to the second movement direction D2 by the first and second orientation layers 1230 and 1280. In one example, the first and second orientation layers 1230 and 1280 may be polyimide layers or include polyimide.

In an example embodiment, a plurality of spacers including a polymer material may further be provided between the first substrate 1210 and the second substrate 1260. The spacer may have a diameter, for example, in a range of about 2.5 µm to about 3 µm. A gap between the first substrate 1210 and the second substrate 1260 may be maintained by the spacer.

The liquid crystal layer 1250 may be formed by injecting the liquid crystals 1252 into the space between the first and second substrates 1210 and 1260. In this case, in a state in which no electric field is applied, the long axes of the liquid crystals 1252 may be arranged to be parallel to the arrangement direction of the plurality of second pattern electrodes 1221. In this way, as the liquid crystals 1252 are orientated, when a voltage is applied between the second pattern electrode 1221 and the second electrode layer 1270 of the first electrode layer 1220, the orientation of the liquid crystals 1252 is changed, and accordingly, incident light may be phase-modulated and deflected.

In this way, in the first beam deflector 900 and the second beam deflector 1000, when no electric field is applied to the liquid crystals 952 and 1252, the orientation of the long axes of the liquid crystals 952 and 1252 is arranged perpendicular to the stripe pattern of the first pattern electrode 921 and the second pattern electrode 1221. Accordingly, incident light is also perpendicular to the stripe pattern and parallel to the long axes of the liquid crystals 952 and 1252. Accordingly, when no electric field is applied, the long axes of the liquid crystals 952 and 1252 are aligned parallel to the first and second moving directions D1 and D2.

In the first and second beam deflectors 900 and 1000, the first and second pattern electrodes 921 and 1221 may be disposed at a constant pitch P in the first movement direction D1 and the second movement direction D2. For example, the pitch P of the first and second pattern electrodes 921 and 1221 may be approximately 2 µm. Because the pattern pitch P is formed to be narrow, a deflection angle of light of the first and second beam deflectors 900 and 1000 may increase. The first and second pattern electrodes 921 and 1221 may have the same width. The width of the first and second pattern electrodes 921 and 1221 may be approximately 1.5 µm, and the length may be approximately 14 mm. The first and second electrode layers 920 and 1220 may include, for example, 7,200 first pattern electrodes 921 and second pattern electrodes 1221, respectively.

In the second beam deflector 1000, an entire stack 1220+1230+1250+1280+1270+1260 formed on the transfer layer 940 may be regarded as one layer structure (configuration). Also, the entire stack 1220+1230+1250+1280+1270+1260 may be viewed as being transferred on the first substrate 1210 together with the transfer layer 940. The layer structure may be expressed as one stack formed on the transfer layer 940.

In an example embodiment, when the transfer layer is provided only in the first beam deflector 900 of the beam deflector 9BD and the transfer layer is not provided in the second beam deflector 1000, in the beam deflector 9BD, the entirety of the plurality of layers (a stack) stacked on the transfer layer 915 (from the first electrode layer 920 to the second substrate 1260) may be regarded as one layer structure, and the entirety of the plurality of layers (a stack) may be considered as being transferred on the first substrate 910 together with the transfer layer 915. Even in this case, the one layer structure may be expressed as one stack.

Figure 11:
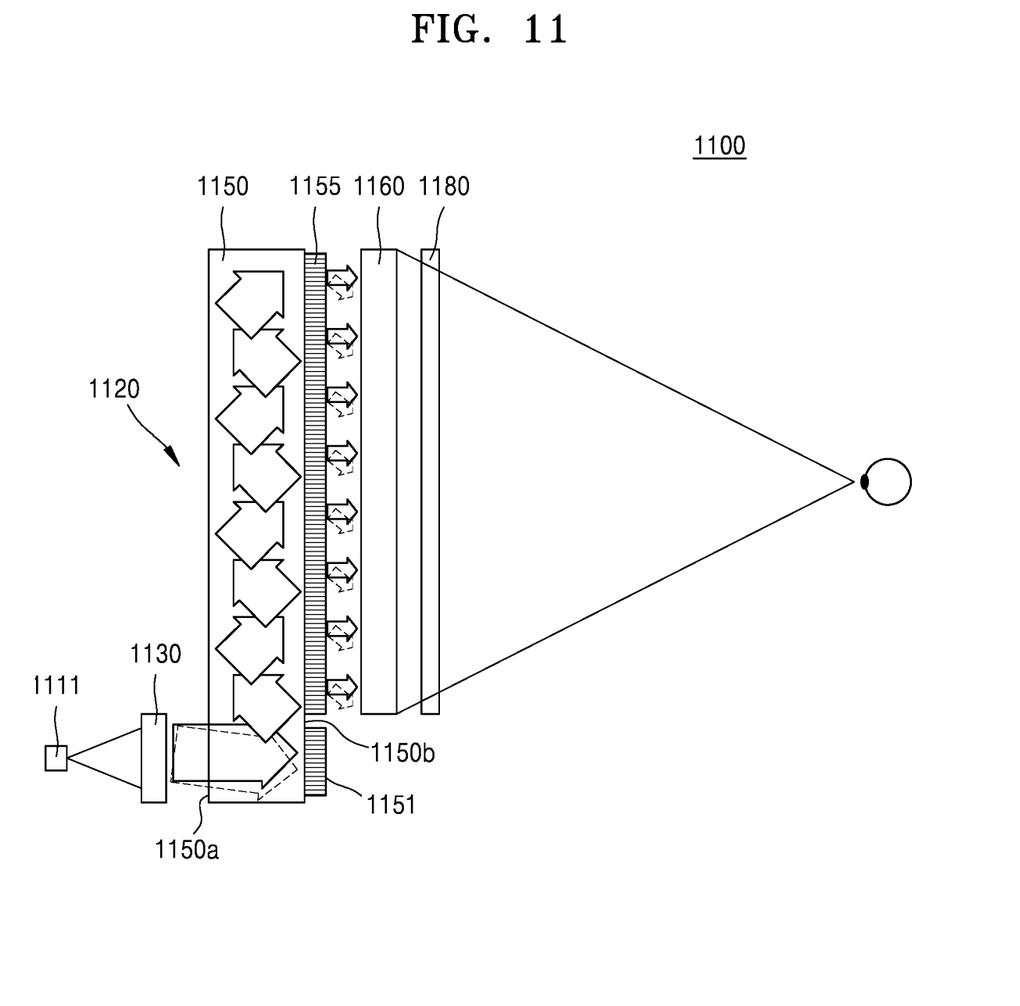
FIG. 11 is a cross-sectional view illustrating a holographic stereoscopic image display device according to an embodiment.

FIG. 11 is a schematic view of a main configuration of a holographic stereoscopic image display device 1100 including a backlight unit 1120 to which the beam deflector 9BD shown in FIGS. 9 and 10 is applied.

Referring to FIG. 11, the holographic stereoscopic image display device 1100 includes the backlight unit 1120 and a spatial light modulator 1180 configured to form a hologram pattern for reproducing a holographic image by modulating light provided from the backlight unit 1120. A hologram pattern formed by the spatial light modulator 1180 may be formed as a holographic image in space by focusing of a lens 1160. The lens 1160 may be disposed between the backlight unit 1120 and the spatial light modulator 1180. Also, the lens 1160 may be disposed in front of the spatial light modulator 1180.

The spatial light modulator 1180 may form a hologram pattern for diffracting and modulating incident light according to a hologram signal provided from an image signal processing unit. The spatial light modulator 1180 may use any one of a phase modulator capable of performing only phase modulation, an amplitude modulator capable of performing only amplitude modulation, and a complex modulator capable of performing both phase and amplitude modulation.

In FIG. 11, although the spatial light modulator 1180 is illustrated as a transmissive spatial light modulator, a reflective spatial light modulator may also be used. In the case of the transmissive spatial light modulator, the spatial light modulator 1180 may use, for example, a semiconductor modulator based on a compound semiconductor, such as GaAs, or a liquid crystal device (LCD). In the reflective spatial light modulator, the spatial light modulator 1180 may use, for example, a digital micromirror device (DMD), a liquid crystal on silicon (LCoS), or a semiconductor modulator.

Since the spatial light modulator 1180 is configured of an array of a plurality of pixels, the array of the plurality of pixels acts as a pixel lattice. Accordingly, light incident on the spatial light modulator 1180 may be diffracted not only by the hologram pattern formed in the spatial light modulator 1180, but also by the pixel grid configured of the array of pixels of the spatial light modulator 1180. In addition, a portion of incident light is not diffracted by the hologram pattern and passes through the spatial light modulator 1180 as it is. As a result, a plurality of lattice spots as well as a holographic image (DC signal) appear on a focal plane of the lens 1160 on which the holographic image is collected. The plurality of lattice spots may be seen by viewer's eyes, and may act as image noise that deteriorates the quality of a holographic image and makes viewing of the holographic image inconvenient.

In order to show a three-dimensional image by sending a holographic image to both eyes, the image noise may diverge from the viewer's eyes by the beam deflector 1130 applied to the backlight unit 1120. Accordingly, the viewer may only watch the holographic image. In one example, the beam deflector 1130 may be or include the beam deflector 9BD according to an embodiment described with reference to FIGS. 9 and 10.

The backlight unit 1120 may include a light source 1111 configured to generate illumination light, a beam deflector 1130 configured to send a holographic image to both eyes to show a three-dimensional image while deflecting the illumination light in two steps so that the image noise is diverged from the viewer's eyes, and a light guide plate 1150 configured to make the illumination light incident from the beam deflector 1130 through a light incident surface advance inside and to exit through a light exit surface. In addition, the backlight unit 1120 may further include an input coupler 1151 configured to make the illumination light incident through the light incident surface of the light guide plate 1150 advance inside of the light guide plate 1150 and an output coupler 1155 configured to emit the illumination light to the outside through the light exit surface of the light guide plate 1150. In addition, the backlight unit 1120 may further include a collimating lens that converts the illumination light emitted from the light source 1111 and incident to the input coupler 1151 into parallel light. However, when the light source 1111 generates collimated illumination light by itself, the collimating lens may be omitted.

The light source 1111 may be a coherent light source emitting coherent light. In order to provide light having high coherence, as the light source 1111, for example, a laser diode (LD) may be used. However, if light has only a certain degree of spatial coherence, it may be sufficiently diffracted and modulated by the spatial light modulator 1180, and thus, as the light source 1111, for example, a light-emitting diode (LED) may be used. Besides the light-emitting diode, any other light source as long as that emits light having spatial coherence may be used as the light source 1111. In addition, in FIG. 11, although the light source 1111 is shown as only one block for convenience, the light source 1111 may include a plurality of point light sources constituting an array. For example, the light source 1111 may include a plurality of red light-emitting lasers, a plurality of green light-emitting lasers, and a plurality of blue light-emitting lasers.

In an example embodiment, the light guide plate 1150 may include transparent glass or transparent plastic. For example, polymethyl methacrylate (PMMA) may be used as a material of the light guide plate 1150. The light guide plate 1150 may have a flat rectangular parallelepiped shape to serve as an optical waveguide for transmitting light. Light incident to one end of the light guide plate 1150 may be transmitted to an opposite end through total internal reflection without loss of light.

The input coupler 1151 diffracts light so as to be inclined toward an inside of the light guide plate 1150. In order to diffract light, the input coupler 1151 may have a lattice structure. For example, light incident on the input coupler 1151 may be diffracted by the input coupler 1151, and then, travels inside the light guide plate 1150 at an inclination angle greater than a critical angle. Then, the light is repeatedly totally reflected on an upper surface 1150b and a lower surface 1150a of the light guide plate 1150 and travels inside the light guide plate 1150.

The output coupler 1155 diffracts light and output the light to the outside of the light guide plate 1150. In order to diffract light, the output coupler 1155 may have a lattice structure. For example, the output coupler 1155 diffracts a portion of light obliquely incident to the output coupler 1155 to be output. In this way, light traveling inside the light guide plate 1150 may be uniformly emitted to the outside of the light guide plate 1150 through the light exit surface of the light guide plate 1150 by the output coupler 1155.

As shown in FIG. 11, the light incident surface may be located on one edge region of the upper surface 1150b of the light guide plate 1150, and the light exit surface may be located on the remaining region of the upper surface 1150b of the light guide plate 1150. The light source 1111 and the beam deflector 1130 may be disposed on a lower side of the light guide plate 1150 corresponding to the light incident surface of the light guide plate 1150. In addition, the input coupler 1151 may be disposed on one edge region of the upper surface 1150b of the light guide plate 1150 to face the light incident surface of the light guide plate 1150. The output coupler 1155 may be disposed adjacent to the input coupler 1151 on the upper surface 1150b of the light guide plate 1150 to face the light exit surface of the light guide plate 1150.

Illumination light may pass through the lower surface 1150a of the light guide plate 1150 and enter the input coupler 1151 on the upper surface 1150b of the light guide plate 1150. The incident illumination light may be diffracted by the input coupler 1151 and travels toward the lower surface 1150a of the light guide plate 1150 in an inclined direction. Then, the illumination light may be totally reflected on the lower surface 1150a of the light guide plate 1150 and travels obliquely toward the upper surface 1150b of the light guide plate 1150. A portion of the illumination light may be totally reflected again on the upper surface 1150b of the light guide plate 1150 and travels towards the lower surface 1150a of the light guide plate 1150, and the other portion of the illumination light may be diffracted by the output coupler 1155 and exits from the light guide plate 1150 to the outside. In this way, the illumination light emitted from the light guide plate 1150 may be provided to the spatial light modulator 1180.

The transfer method described above using the transfer layer may be used to form various elements or layer structures (configurations). For example, in the case of forming electrode layers on both surfaces of a substrate, the transfer method described above may be used. Here, the substrate may be an insulating substrate, and both surfaces of the substrate may be opposite to each other, for example, one of the two surfaces may be an upper surface of the substrate, and the other surface may be a lower surface opposite to the upper surface.

Figure 12:
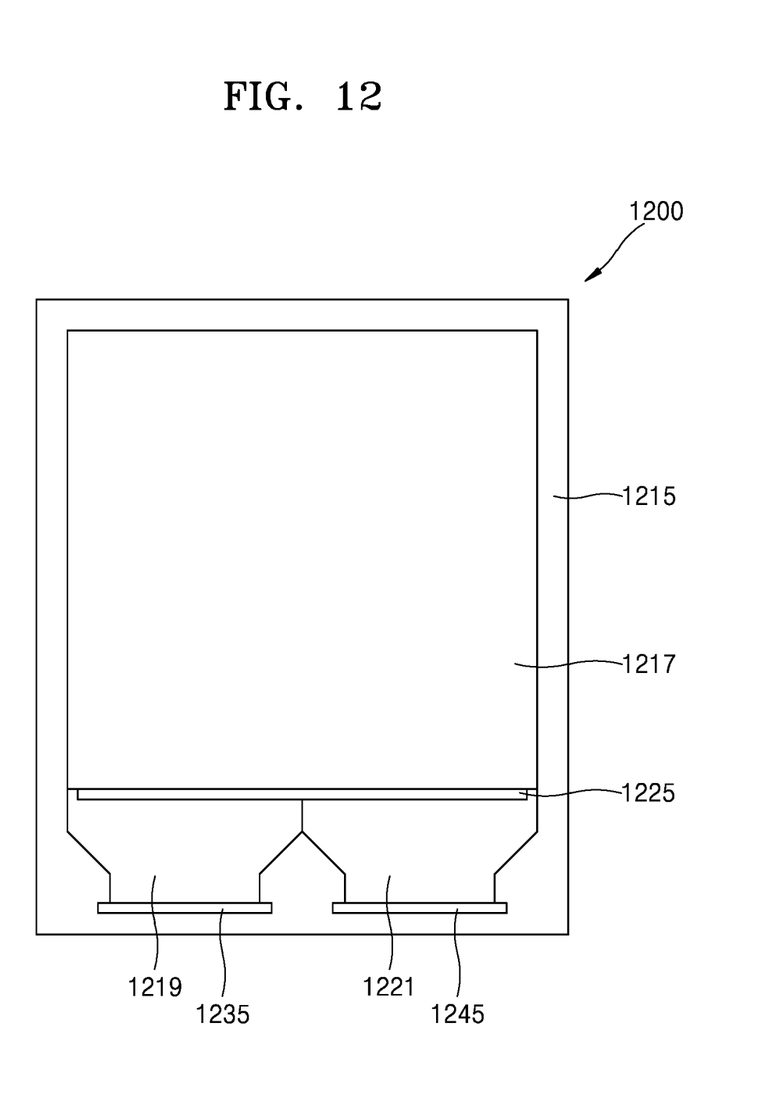
FIG. 12 is a plan view illustrating an electronic device according to an embodiment.

FIG. 12 shows a second electronic device 1200 according to an embodiment. FIG. 12 is a plan view illustrating an example of BDL.

Referring to FIG. 12, the second electronic device 1200 may include a substrate layer 1215, an active region 1217 occupying a portion of the substrate layer 1215, first and second tracers 1235 and 1245, first and second bonding regions 1235 and 1245, and a transistor array 1225, and may further include other members. In one example, a material of the substrate layer 1215 may be the same as the material of the substrate included in the beam deflector 9BD of FIG. 10, for example, the first substrate 910, but is not limited thereto. In an example embodiment, the active region 1217 may be covered with a transparent electrode. A second stack including components causing a beam deflection operation with respect to incident light may be provided in the active region 1217. The second stack may be the first stack 130 of FIG. 1 or may include the first stack 130. For example, the second stack may include at least one of the first and second beam deflectors 900 and 1000 of the beam deflector 9BD of FIG. 10.

The first and second tracers 1219 and 1221 may be provided side by side on the substrate layer 1215 on one side of the active region 1217. The first and second tracers 1219 and 1221 may be provided side by side in a direction perpendicular to the one side of the active region 1217. The first and second tracers 1219 and 1221 may be provided to have a configuration connected to the active region 1217. The first and second tracers 1219 and 1221 may be provided to have a configuration in which widths are narrowed in a direction away from the active region 1217, respectively.

The first bonding region 1235 may be provided at an end of the first tracer 1219 and may be in contact with the end of the first tracer 1219. The first bonding region 1235 may be a metal bonding pad or may include a metal bonding pad. The second bonding region 1245 may be provided at an end of the second tracer 1221 and may be in contact with the end of the second tracer 1221. The second bonding region 1245 may be a metal bonding pad or may include a metal bonding pad. Materials of the metal bonding pads that constitute the first and second bonding regions 1235 and 1245 may be the same or different from each other.

The planar shape and/or sizes of the first and second tracers 1219 and 1221 disposed between the active region 1217 and the first and second bonding regions 1235 and 1245 may be the same or different from each other.

The transistor array 1225 may be provided between the active region 1217 and the first and second tracers 1219 and 1221, but is not limited thereto. In one example, the transistor array 1225 may include a plurality of TFTs. In one example, the TFT may be a multiplexer TFT (MUX TFT). The transistor array 1225 may be connected to a second stack provided in the active region 1217, and may be connected to the first and second tracers 1219 and 1221.

In an example embodiment, the electronic device described above may include an insulating layer and/or a passivation layer, wherein the insulating layer and/or the passivation layer may include propylene glycol monomethyl ether acetate (PGMEA), diethylene glycol methyl ethyl ester (MEDG), 3-Methoxy-1-butanol (MB), resin, and additives.

Figure 13:
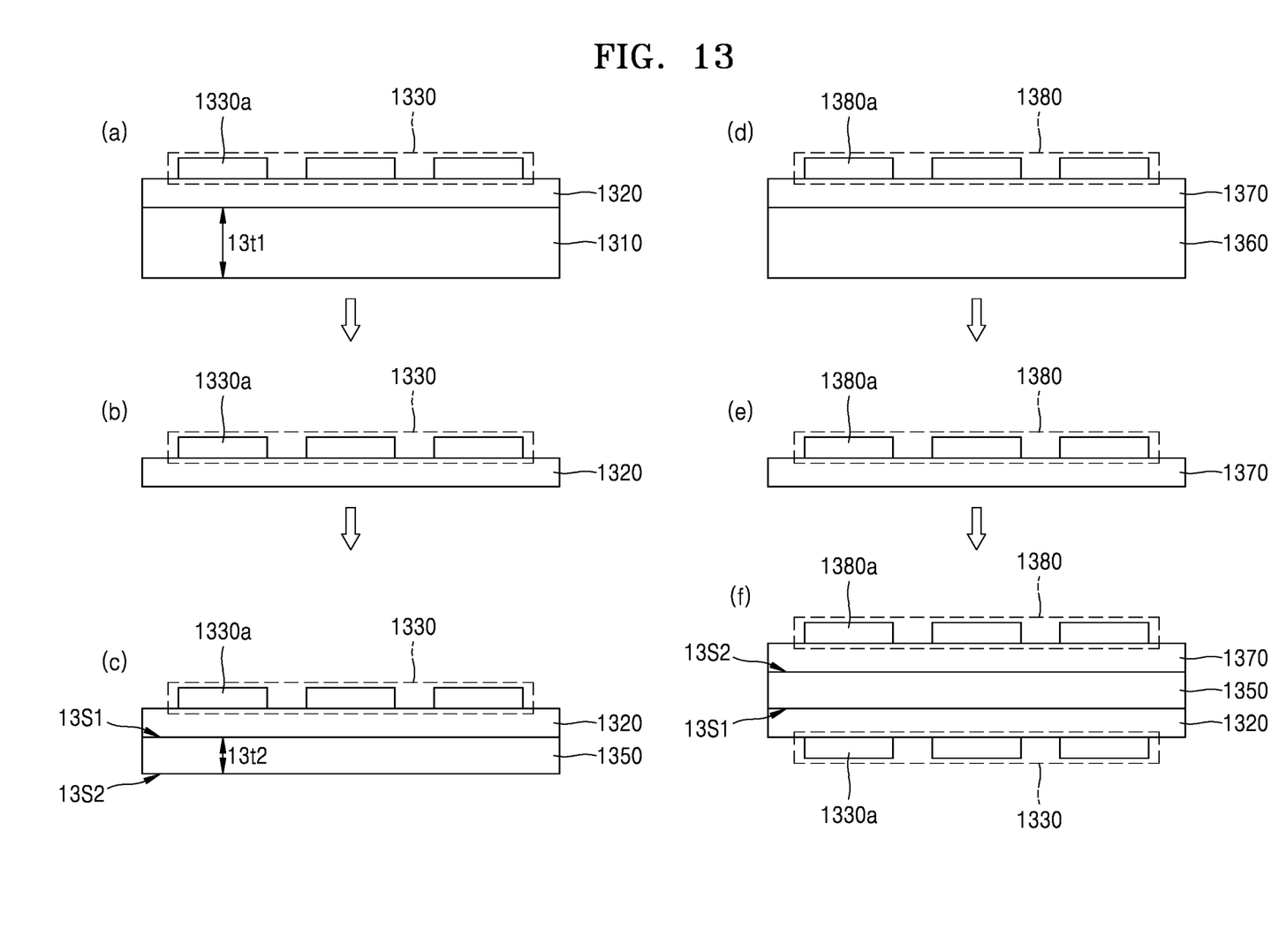
FIG. 13 is a cross-sectional view illustrating a method of forming electrode layers on both surfaces of a substrate, according to an embodiment.

FIG. 13 shows a method of forming electrode layers on both surfaces of a substrate by using the transfer method using a transfer layer described above, according to an embodiment First, as shown in view (a) of FIG. 13, a first transfer layer 1320 is formed on a first substrate 1310 having a first thickness 13$t$1. The first substrate 1310 may be an insulating substrate. In one example, the first substrate 1310 may be a multi-layered substrate, and at least one of an upper surface and a lower surface of the first substrate 1310 may be an insulating layer. The entire surface of the first substrate 1310 on which the first transfer layer 1320 is formed may be entirely flat. The first transfer layer 1320 may be or include the transfer layer 120 described with reference to FIG. 1, but is not limited thereto. For example, at least one of a material and a thickness of the first transfer layer 1320 may be different from that of the transfer layer 120 described with reference to FIG. 1. A first electrode layer 1330 may be formed on the first transfer layer 1320. The first electrode layer 1330 may include a plurality of electrodes 1330$a$ separated from each other. The plurality of electrodes 1330$a$ may be arranged to have a given shape. That is, the plurality of electrodes 1330$a$ may form an array. For example, the plurality of electrodes 1330$a$ may be arranged parallel to each other in a given direction in a stripe shape. Thicknesses of the plurality of electrodes 1330$a$ may be the same or substantially the same as each other, and widths may also be the same. The expression that 'the plurality of electrodes 1330$a$ may be substantially the same' indicates that the plurality of electrodes 1330$a$ may be the same within an error or tolerance that may occur in a process of forming the electrodes. The thicknesses of the plurality of electrodes 1330$a$ may be the same as or different from that of the first transfer layer 1320. In an example embodiment, the thicknesses of the plurality of electrodes 1330$a$ may be less than that of the first transfer layer 1320. The thicknesses of the first transfer layer 1320 and the first electrode layer 1330 may both be less than the first thickness 13$t$1 of the first substrate 1310, but may not be limited thereto. The plurality of electrodes 1330$a$ may be expressed as a plurality of pattern electrodes.

In one example, the material of the first electrode layer 1330, that is, the material of the plurality of electrodes 1330$a$ may be or include ITO, IZO, ITZO, AgNW, polypyrrole, polyaniline, or Pidot.

Next, as shown in view (b) of FIG. 13, the first substrate 1310 is separated from the resultant product of view (a), remaining only the first transfer layer 1320 and the first electrode layer 1330 formed thereon.

The separation of the first substrate 1310 from the first transfer layer 1320 may use an interface separation method in which ultraviolet (UV) rays are irradiated between the first substrate 1310 and the first transfer layer 1320. To this end, an interface separation layer that responses to UV irradiation may be formed between the first substrate 1310 and the first transfer layer 1320. In an example embodiment, the interface separation layer may be formed on a surface of the first substrate 1310 on which the first transfer layer 1320 is formed or on a surface of the first transfer layer 1320 in contact with the first substrate 1310, but is not limited thereto.

Next, as shown in view (c) of FIG. 13, the first transfer layer 1320 and the first electrode layer 1330 remaining after the first substrate 1310 is separated are transferred on a first surface 13S1 of a second substrate 1350 having a second thickness 13$t$2. The second thickness 13$t$2 is less than the first thickness 13$t$1. In an example embodiment, the second thickness 13$t$2 may be the same as or different from the thickness of the substrate 110 of FIG. 1. In an example embodiment, the first surface 13S1 of the second substrate 1350 is a surface to which the first transfer layer 1320 of the second substrate 1350 is transferred, and may be regarded as an upper surface in view (c) of FIG. 13, but, depending on the viewpoint, the first surface 13S1 may be variously expressed, such as a lower surface, a bottom surface, or a side surface. The second substrate 1350 may be a substrate onto both surfaces of which transfer layers are to be transferred, and thus, may be referred to as a transfer target substrate. Before the first transfer layer 1320 is transferred, the first surface 13S1 of the second substrate 1350 may be coated with a gluing agent or an adhesive. The gluing agent or adhesive may also be coated on the surface of the first transfer layer 1320 to be bonded to the first surface 13S1 of the second substrate 1350. The gluing agent or adhesive may be coated on both the second substrate 1350 and the first transfer layer 1320 as illustrated in FIG. 7.

The second substrate 1350 may be a single-layered insulating substrate, but may also be a double-layered or multi-layered insulating substrate. For example, the second substrate 1350 may be an entirely insulating layer of a single-layer substrate. For example, the second substrate 1350 may be a substrate in which the first surface 13S1 to which the first transfer layer 1320 is transferred and a second surface 13S2 to which another transfer layer may be transferred in a subsequent process are insulating layers or insulating surfaces, and a conductive layer is provided between the first surface 13S1 and the first surface 13S2, but is not limited thereto. The first and second surfaces 13S1 and 13S2 may face each other and may be opposite to each other.

Next, as shown in view (d) of FIG. 13, a second transfer layer 1370 is formed on a third substrate 1360 having a third thickness 13$t$3. The material and dimensions of the third substrate 1360 may be the same as or different from those of the first substrate 1310. The third thickness 13$t$3 may be the same as or different from the first thickness 13$t$1, and may be greater than the second thickness 13$t$2. The material and dimensions of the second transfer layer 1370 may be the same as those of the first transfer layer 1320, but may be different from each other.

After the second transfer layer 1370 is formed, a second electrode layer 1380 is formed on the second transfer layer 1370. The second electrode layer 1380 may include a plurality of electrodes 1380*a*. The plurality of electrodes 1380*a* may be separated from each other and form an array of a given shape. Materials, dimensions, and alignment of the plurality of electrodes 1380*a* may be the same as those of the plurality of electrodes 1330*a* of the first electrode layer 1330, but may be different from each other.

Next, as shown in view (e) of FIG. 13, the third substrate 1360 is separated (removed) from the resultant product of view (d). In other words, the third substrate 1360 and the second transfer layer 1370 are separated. The third substrate 1360 and the second transfer layer 1370 may be separated by using the same method as the separation method used to separate the first substrate 1310 from the first transfer layer 1320, but may be separated by another method.

Next, as shown in view (f) of FIG. 13, a resultant product from which the third substrate 1360 is separated, that is, the second transfer layer 1370 and the second electrode layer 1380 formed thereon is transferred on the second surface 13S2 of the second substrate 1350.

Before the transfer of the second transfer layer 1370, the second substrate 1350 may be rotated or turned over so that the second surface 13S2 of the second substrate 1350 is positioned thereon. Also, before the transfer of the second transfer layer 1370, the second surface 13S2 of the second substrate 1350 may be coated with a gluing agent or an adhesive. The gluing agent or adhesive may be coated on a surface of the second transfer layer 1370 to be bonded to the second surface 13S2 of the second substrate 1350. The gluing agent or adhesive may be coated on both the second substrate 1350 and the second transfer layer 1370 as illustrated in FIG. 7.

In this way, electrode layers 1330 and 1380 are respectively formed on the two surfaces 13S1 and 13S2 separated from each other of the second substrate 1350. A layered structure in which the electrode layers 1330 and 1380 are respectively formed on both surfaces 13S1 and 13S2 of the substrate 1350 may be used as one component of an electronic device or one component of an electronic apparatus.

An electrode layer formed on any one of the first and second surfaces 13S1 and 13S2 of the second substrate 1350 may be expressed as a first stack, and an electrode layer formed on the other surface of the second substrate 1350 may be expressed as a second stack.

Each of the electrode layers 1330 and 1380 is illustrated as including three electrodes, respectively, but this is an example, and each of the electrode layers 1330 and 1380 may include one electrode, or may include more than three electrodes.

In the case of the electronic device according to an example embodiment, a transfer layer is formed on a separate substrate that may be called a mother substrate, and, after forming a stack (e.g., the rest of the electronic device except for the substrate) having a layer structure (configuration) on the transfer layer, the stack is transferred together with the transfer layer on a transfer target substrate that is to be a substrate of an electronic device.

As described above, because a layer structure formed on a substrate of an electronic device is formed on a separate substrate, the transfer target substrate is free from a deposition process and a patterning process for forming the layer structure. That is, the transfer target substrate is not exposed in a semiconductor manufacturing equipment that is used in a process such as deposition process and a patterning process.

Accordingly, the transfer target substrate may have a thickness less than a limit thickness of the substrates compatible with the semiconductor manufacturing equipment. Accordingly, the transfer target substrate may be free from a limit thickness.

Therefore, the disclosed electronic device may have a small thickness less than an electronic device of the related art, and the electronic device itself may be slimmer than the related art one, and it may be helpful for slimming of an electronic device using the disclosed electronic device as a component.

In addition, the transfer method using the mother substrate and the transfer target substrate may help the simplification of the complicated manufacturing process of devices or parts. For example, when forming electrode layers on both surfaces of an insulating substrate, the electrode layers to be formed on both surfaces are respectively formed on separate substrates using a transfer layer, and then the formed electrode layers are transferred to both surfaces of the insulating substrate. This method may be much simpler than the related art method of applying a deposition process and a patterning process to both surfaces of the insulating substrate.

In addition, since main layers included in the disclosed electronic device are formed on a transfer layer of an organic material on a separate substrate, the main layers may be formed in a low-temperature process in which the transfer layer is not damaged. For this purpose, materials suitable for the low-temperature process may be used as the materials of the main layers. Consequently, by using the disclosed method of manufacturing an electronic device, a high-temperature process may be avoided.

While many details are set forth in the foregoing description, they should be construed as illustrative of example embodiments, rather than to limit the scope of the disclosure. Therefore, the scope of the present disclosure should not be defined by the described embodiments, but should be determined by the technical spirit described in the claims.

It should be understood that the example embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An electronic device comprising:
   a substrate having a thickness less than 0.7 mm, the substrate comprising at least one of a glass substrate and a silicon substrate;
   a first transfer layer directly contacting a first surface of the substrate, the first transfer layer including an organic material;
   a first stack provided on the first transfer layer;
   a second transfer layer directly contacting a second surface of the substrate that is opposite to the first surface of the substrate; and
   a second stack provided on the second transfer layer.

2. The electronic device of claim 1, wherein the second transfer layer includes an organic material.

3. The electronic device of claim 1, wherein the first stack includes a first electrode layer.

4. The electronic device of claim 1, wherein the second stack includes a second electrode layer.

5. An electronic apparatus comprising:
at least a light source configured to generate light; and
a beam deflector configured to deflect the light,
wherein the beam deflector comprises:
a substrate having a thickness less than 0.7 mm, the substrate comprising at least one of a glass substrate and a silicon substrate;
a first transfer layer directly contacting a first surface of the substrate, the first transfer layer including an organic material;
a first stack provided on the first transfer layer;
a second transfer layer directly contacting a second surface of the substrate that is opposite to the first surface of the substrate; and
a second stack provided on the second transfer layer.

6. The electronic device of claim 1, wherein the substrate is a single layer substrate.

7. An electronic device comprising:
a substrate having a thickness less than 0.7 mm, the substrate comprising at least one of a glass substrate and a silicon substrate;
a first adhesive layer directly contacting a first surface of the substrate,
a first transfer layer directly contacting the first adhesive layer, the first transfer layer including an organic material;
a first stack provided on the first transfer layer;
a second adhesive layer directly contacting a second surface of the substrate that is opposite to the first surface of the substrate;
a second transfer layer directly contacting the second adhesive layer; and
a second stack provided on the second transfer layer,
wherein the substrate is a single layer substrate.

* * * * *